United States Patent
Honda

(10) Patent No.: US 8,571,379 B2
(45) Date of Patent: Oct. 29, 2013

(54) VIDEO REPRODUCTION METHOD, VIDEO REPRODUCTION DEVICE, AND VIDEO DISTRIBUTION SYSTEM

(75) Inventor: Atsushi Honda, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 439 days.

(21) Appl. No.: 12/940,187

(22) Filed: Nov. 5, 2010

(65) Prior Publication Data

US 2011/0044603 A1 Feb. 24, 2011

Related U.S. Application Data

(63) Continuation of application No. PCT/JP2009/001745, filed on Apr. 15, 2009.

(30) Foreign Application Priority Data

Jun. 16, 2008 (JP) ................... 2008-156806

(51) Int. Cl.
*H04N 5/77* (2006.01)

(52) U.S. Cl.
USPC ........... 386/224; 386/291; 386/292; 386/294; 386/295; 386/279

(58) Field of Classification Search
USPC .................. 386/224, 291, 292, 294, 295, 279
See application file for complete search history.

(56) References Cited

U.S. PATENT DOCUMENTS

2002/0194351 A1* 12/2002 Nishimura et al. ........... 709/229
2005/0151836 A1* 7/2005 Ni ............................... 348/14.09

FOREIGN PATENT DOCUMENTS

| JP | 09182056 | 7/1997 |
| JP | 11041587 | 2/1999 |
| WO | 2005096635 | 10/2005 |

\* cited by examiner

*Primary Examiner* — Daquan Zhao
*Assistant Examiner* — Sunghyoun Park
(74) *Attorney, Agent, or Firm* — Bacon & Thomas, PLLC

(57) ABSTRACT

In case that a plurality of video reproduction devices obtains video data from one same camera, a distribution rate thereof may be decreased to be lower than that expected by a user. There is provided a video reproduction device or system capable of obtaining a video from a camera at a distribution rate that is expected by the user. In case that a video reproduction device newly requests the camera to distribute a video thereto, if the camera has been distributing the video to a different video reproduction device and a video distribution capacity of the camera is less than a sum of a distribution rate of the different video reproduction device and a distribution rate requested by the video reproduction device, the video reproduction device requests the different video reproduction device to distribute the video thereto and receives it from the different video reproduction device.

7 Claims, 13 Drawing Sheets

VIDEO REPRODUCTION METHOD, VIDEO REPRODUCTION DEVICE, AND VIDEO DISTRIBUTION SYSTEM

This application is a Continuation Application of PCT International Application No. PCT/JP2009/001745 filed on Apr. 15, 2009, which designated the United States.

FIELD OF THE INVENTION

The present invention relates to a video reproduction device for obtaining a video distributed from a camera or the like through network communications and reproducing the obtained video; and, more particularly, to a technique for reducing load on a camera.

BACKGROUND OF THE INVENTION

A network camera video reproduction device serves to obtain a video distributed from a camera or the like through network communications and reproduces the obtained video. The network camera video reproduction device (hereinafter, simply referred to as "video reproduction device") obtains video data from a camera connected to a network through network communications and reproduces a video based on the obtained video data by user's manipulation. Such a device has been disclosed in, e.g., Japanese Patent Application Publication Nos. 2005-295106, 2005-311670 and H11-041587.

The network camera video reproduction device is typically used in a CCTV (Closed Circuit Tele-Vision) monitoring system such as a road monitoring system for monitoring roads, a river monitoring system for monitoring a specific area of a river, or the like.

The video reproduction device obtains a video from a camera connected to the network at an operation request from a user. At this time, a plurality of (e.g., N (N being a natural number that is equal to or greater than 2)) video reproduction devices may obtain video data from the same camera. In case that the camera that performs the distribution though the network has a video distribution capacity M, when the N video reproduction devices respectively obtain video data, the distribution rate of the video data per device becomes M/N. Here, M is the capacity that one camera connected to a network can distribute a video having a predetermined size to the network per unit time. For example, if the video distribution capacity of a camera is 60, this indicates that the camera has the distribution capacity of 60 fps (frames per second), that is, the camera can distribute a 60-frame video to the network per second at the maximum. Accordingly, in case when two video reproduction devices are connected to the same camera, when the video reproduction devices equally obtain video data, each of the video reproduction devices can obtain the video at the distribution rate of 30 fps.

In the case of one or a few video reproduction devices for example, in case a distribution rate is equal to or larger than that expected by a user who uses the video reproduction device, there may be no problem. However, in the case of a plurality of video reproduction devices, the distribution may be performed at a lower distribution rate than that expected by the user.

SUMMARY OF THE INVENTION

In view of the above, the present invention provides a video reproduction device or a video distribution system, capable of allowing a video to be respectively distributed from a camera or the like to a plurality of network video reproduction devices through a network at a distribution rate expected by a user.

In accordance with an aspect of the present invention, there is provided a video reproduction method of a video reproduction device that obtains a video photographed by a camera connected to a network therefrom by communications through the network and reproduces the obtained video. In case that the video reproduction device requests the camera to distribute the video photographed by the camera thereto, if the camera has been distributing the video to a different video reproduction device and a video distribution capacity of the camera is smaller than a sum of a distribution rate of the different video reproduction device and a distribution rate requested by the video reproduction device, the video reproduction device requests the different video reproduction device to distribute the video thereto and receives it from the different video reproduction device.

In accordance with another aspect of the present invention, there is provided a video reproduction device that obtains a video photographed by a camera connected to a network therefrom by communications through the network and reproduces the obtained video. The device includes: a relay unit for re-distributing the video photographed by the camera to a different video reproduction device when the different video reproduction device requests the video reproduction device to distribute the video thereto in case that the video reproduction device has been receiving the video from the camera.

In accordance with still another aspect of the present invention, there is provided a video distribution system including a camera for distributing a photographed video through a network; and a plurality of video reproduction devices for reproducing the video photographed by the camera. In case that one of the video reproduction devices newly requests the camera to distribute the photographed video thereto, if a distribution rate of the video reproduction devices including the one that newly requests the distribution of the video goes beyond a video reproduction capacity of the camera, the video distribution system outputs a notification that the distribution is impossible to the video reproduction device that newly requests the distribution of the video; and the video reproduction device that has received the notification requests another video reproduction device that has been receiving the video to distribute the video thereto and obtains the video from the another video reproduction device.

Preferably, in the video distribution system of the present invention, the camera transmits the notification and information related to the different video reproduction device.

Preferably, in the video distribution system of the present invention, the video reproduction device searches other video reproduction devices that have been receiving video data from the camera through the network and requests the searched video reproduction device to distribute the video data thereto.

In accordance with embodiments of the present invention, it is possible to acquire a distribution rate, expected by a user who uses a network camera video reproduction device, regardless of a video distribution capacity of a camera or a video data output device that distributes the video data through the network.

In accordance with the embodiments of the present invention, it is also possible to provide a network camera video reproduction device without the conventional problem that a distribution rate is restricted when video data is distributed from one network camera to a plurality of network camera video reproduction devices.

DETAILED DESCRIPTION OF THE EMBODIMENTS

Figure 1:
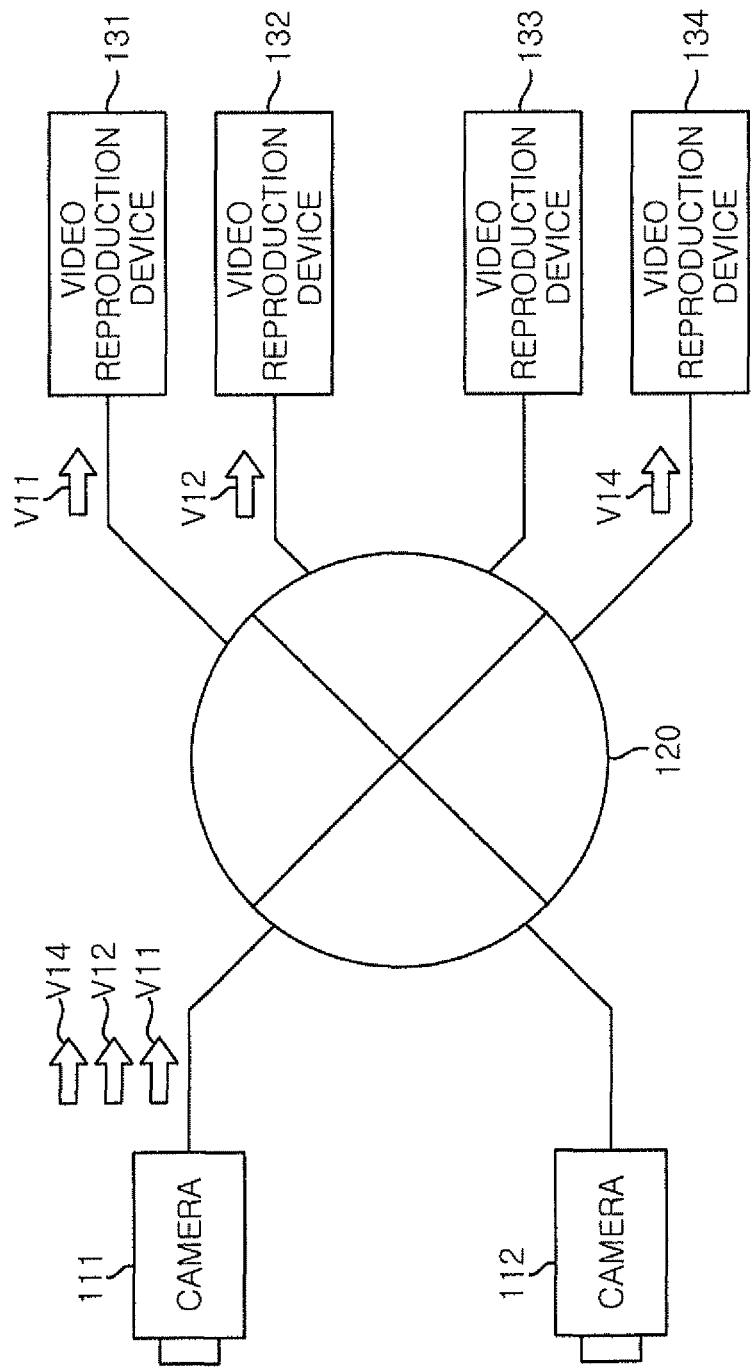
FIG. 1 is a block diagram showing a structure of a system where a video reproduction device obtains a video photographed by a camera through a network.

An embodiment of the present invention will now be described with reference to the accompanying drawings.

Further, in the following description and drawings, components having substantially same configurations and functions are denoted by like reference characters, and thus redundant description thereof will be omitted herein.

First, a general process of obtaining a video from a camera connected to a network in a network camera video reproduction device (hereinafter, referred to as "video reproduction device) shown in FIG. 1 at an operation request from a user will be described. FIG. 1 is a block diagram showing a structure of a video distribution system in which a video reproduction device obtains a video photographed by a camera through a network. Reference numerals 111 and 112, 120, 131 to 134, and V11, V12 and V14 indicate cameras, a network, video reproduction devices and streams of photographed videos, respectively.

Each of the cameras 111 and 112 is a web camera including a web encoder, for example. Each of the cameras 111 and 112 distributes, e.g., a VGA type video, and the frame rate thereof required by the video reproduction device is determined as, e.g., 30 fps.

In FIG. 1, each of the cameras 111 and 112 photographs target objects within its visual range. Then, when receiving a distribution request from at least one of the video reproduction devices 131 to 134, the camera 111 or 112 converts the photographed video into a JPEG (Joint Photographic Expert Group) format video and transmits it to the video reproduction device(s) 131, 132, 133 and/or 134.

For example, in case that each of the video reproduction devices 131, 132 and 134 in the quantities of N (in this case, N=3) requests the camera 111 to transfer a video photographed by the camera 111 thereto, these three video reproduction devices 131, 132 and 134 obtain corresponding video data from the same camera (the camera 111). In this case, when the camera 111 that performs the distribution through the network 120 has a video distribution capacity M of 120 fps and each of the video reproduction devices 131, 132 and 134 obtains the video data, the distribution rate per device becomes M/N, i.e., 40 fps.

As such, in case that the camera 111 has a sufficient distribution capacity, the camera can generate three video streams V11, V12 and V14 and distribute them to the respective video reproduction devices 131, 132 and 134 through the network 120 in order to distribute the same video thereto.

Accordingly, the video reproduction devices 131, 132 and 134 respectively receive and reproduce the video streams V11, V12 and V14.

Moreover, for example, in case that the video distribution capacity M of the camera 111 is 60 fps and two video reproduction devices are connected to the camera 111 wherein the two video reproduction devices equally obtain video data, each of the video reproduction devices can obtain the video at 30 fps.

However, if the camera 111 receives the distribution request from an additional video reproduction device (i.e., three video reproduction devices in total), the frame rate at which the camera 111 can distribute video data to each of the respective video reproduction devices becomes 20 fps. As such, when a plurality of video reproduction devices receives the video data, a corresponding distribution rate may become lower than that expected by a user.

In view of the above, in accordance with the present invention, as will be described below, video streams are not directly distributed from the camera to all the video reproduction devices. Some of the video reproduction devices receive the video streams directly from the camera, but the other video reproduction devices receive them through the network from the video reproduction devices that have already received the video streams.

In the above, the structure including two cameras and four video reproduction devices has been illustrated as an example, but the numbers of the cameras and the video reproduction devices are not limited thereto.

In the meantime, the cameras may have different video distribution capacities, and the video reproduction devices may request video data to be distributed thereto at different frame rates.

Figure 2:
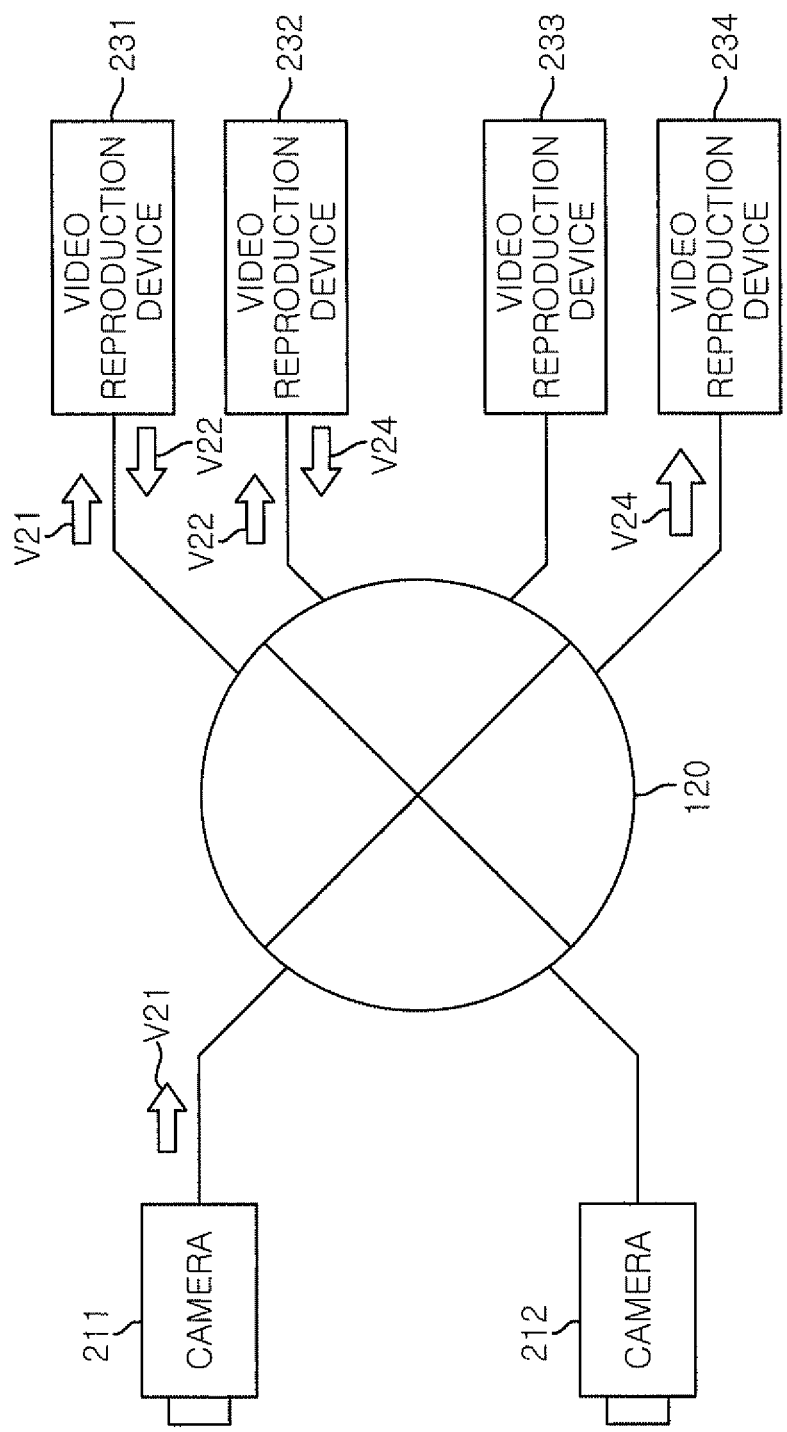
FIG. 2 is a block diagram showing a structure including a video reproduction device and a video distribution system in accordance with an embodiment of the present invention.
Figure 3:
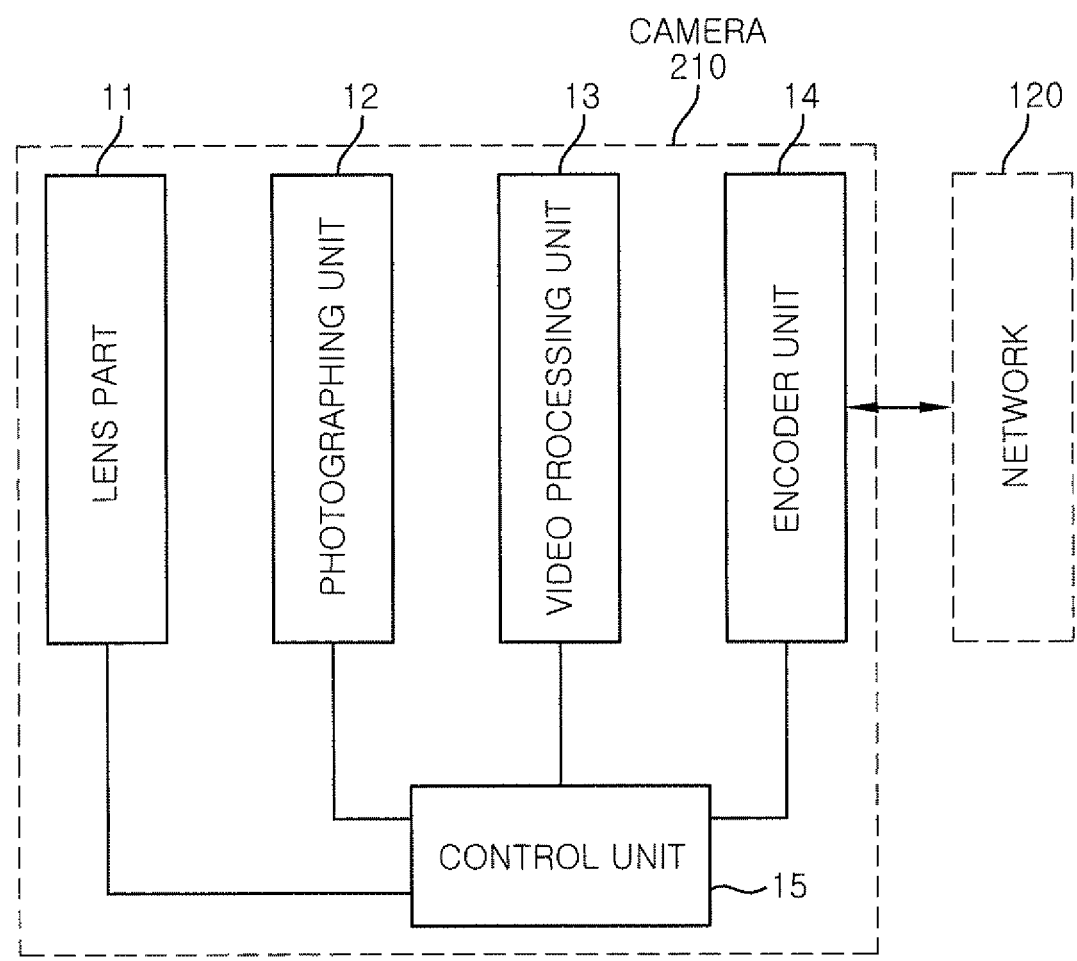
FIG. 3 is a block diagram showing a structure of a camera of the video distribution system in accordance with the embodiment of the present invention.
Figure 4:
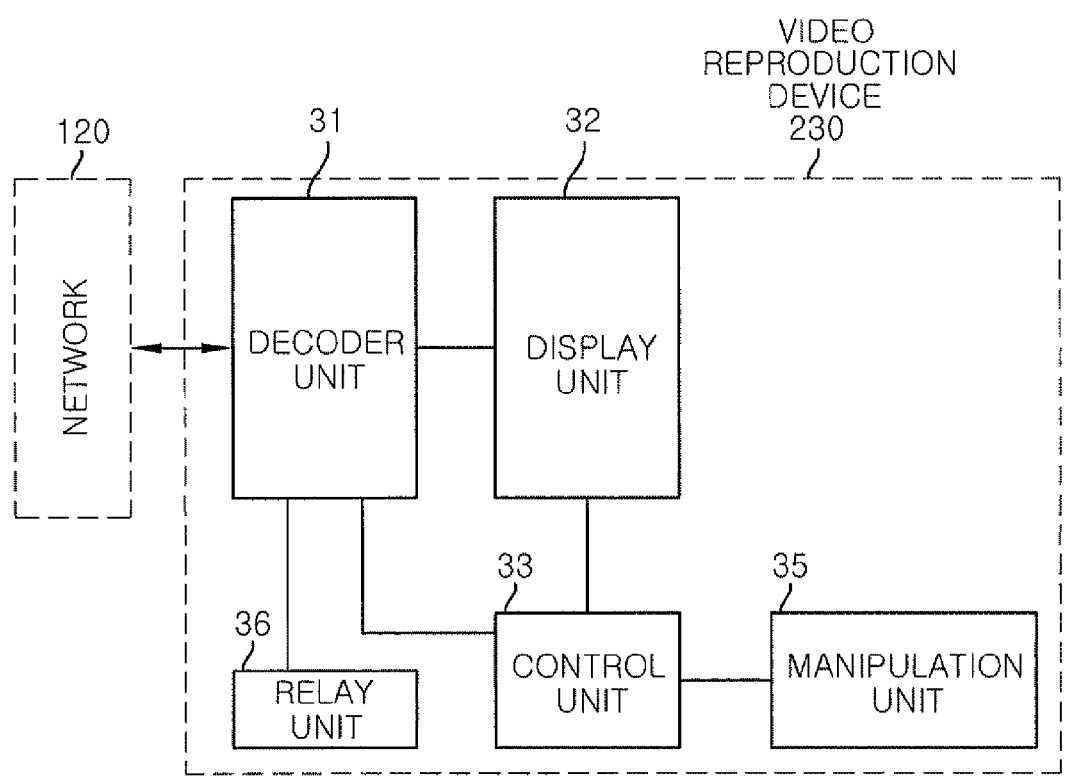
FIG. 4 is a block diagram showing a video reproduction device in accordance with the embodiment of the present invention.

An embodiment of the present invention will be described with reference to FIGS. 2 to 7. FIG. 2 is a block diagram showing a structure including a network camera video reproduction device (hereinafter, referred to as "video reproduction device") and a video distribution system in accordance with the embodiment of the present invention. FIG. 3 is a block diagram showing a camera of the video distribution system in accordance with the embodiment of the present invention. Reference numerals 210, 11, 12, 13, 14 and 15 indicate a camera, a lens unit, a photographing unit, a video processing unit, an encoder unit and a control unit including a CPU (Central Processing Unit) and the like. FIG. 4 is a block diagram showing a structure of the video reproduction device in accordance with the embodiment of the present invention. Reference numerals 230, 31, 32, 33, 35 and 36 indicate a video reproduction device, a decoder unit, a display unit, a control unit including a CPU and the like, a manipulating unit and a relay unit, respectively.

Figure 5:
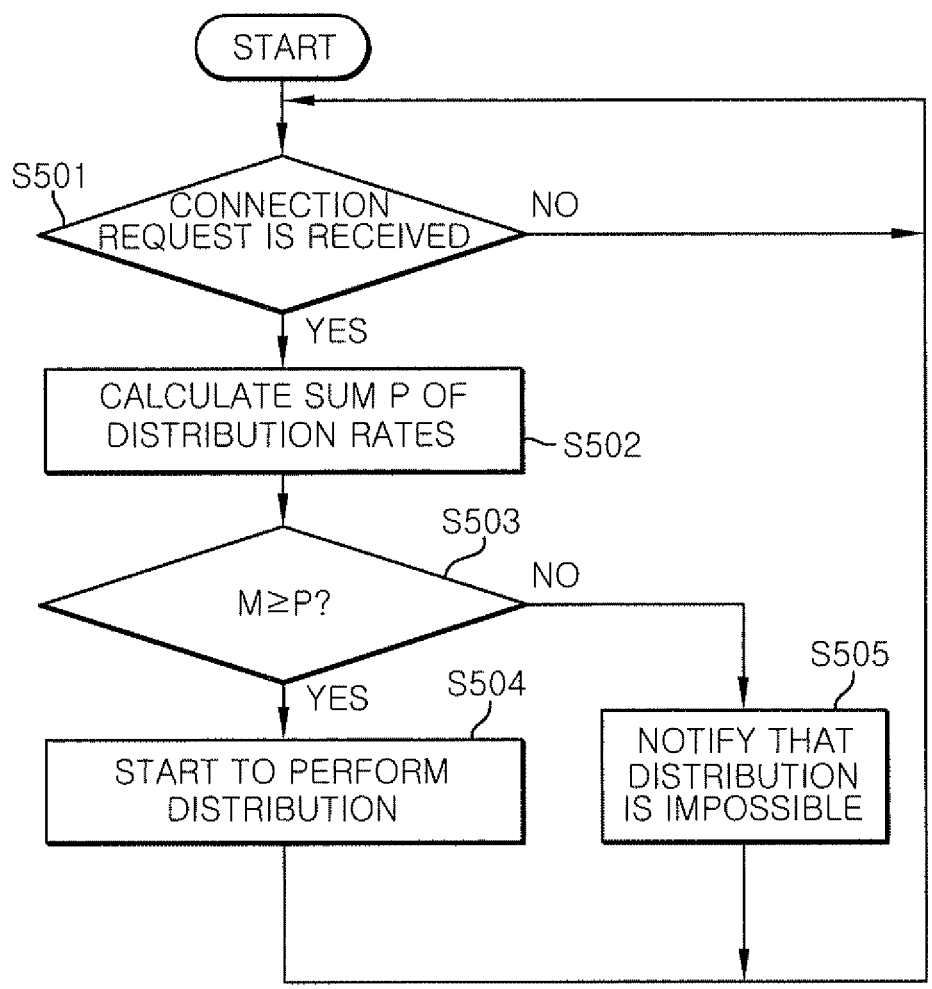
FIG. 5 is a flowchart showing a process of the camera in accordance with the embodiment of the present invention.
Figure 6:
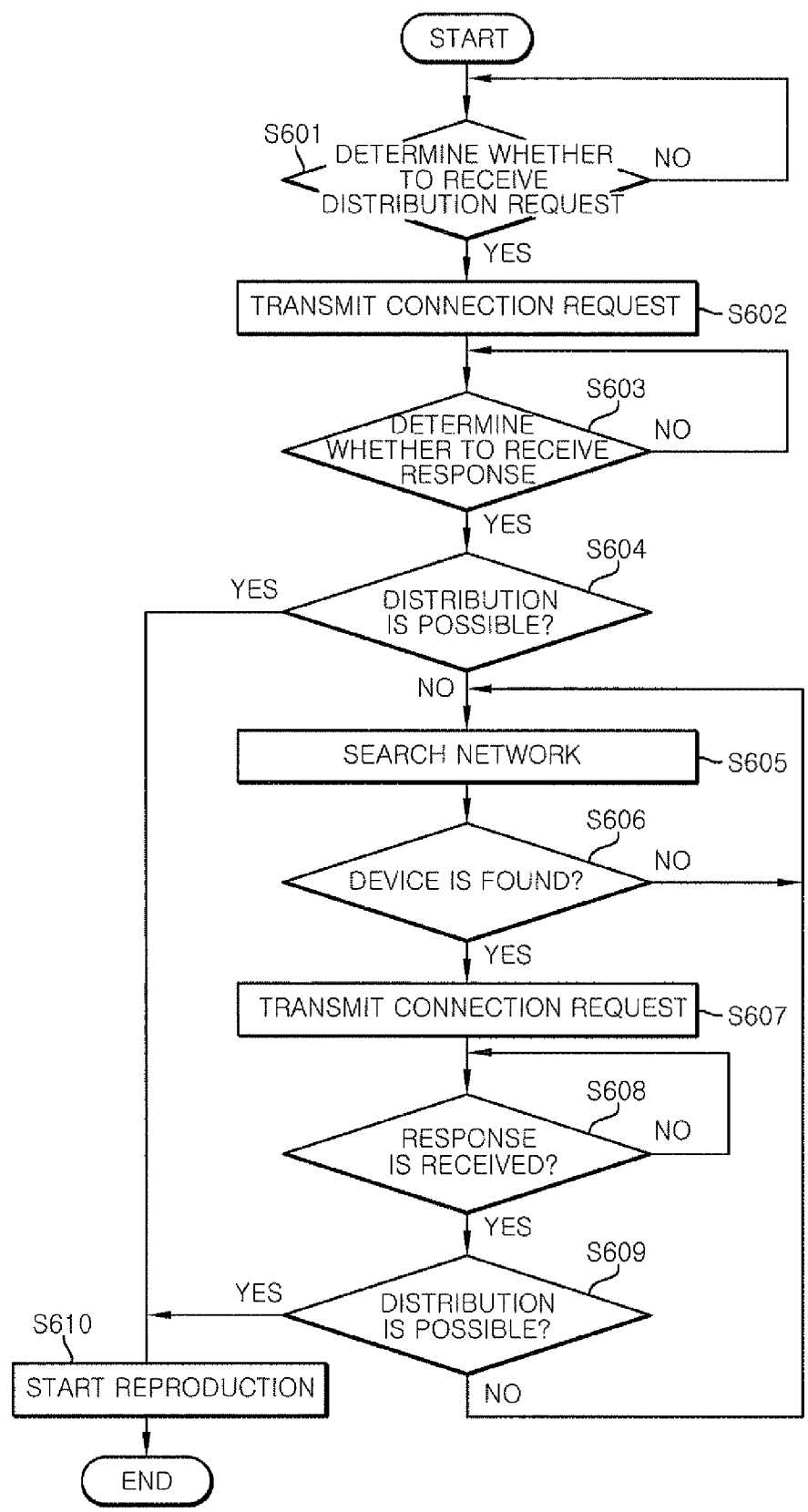
FIG. 6 is a flowchart showing a process of the video reproduction device in accordance with the embodiment of the present invention.
Figure 7:
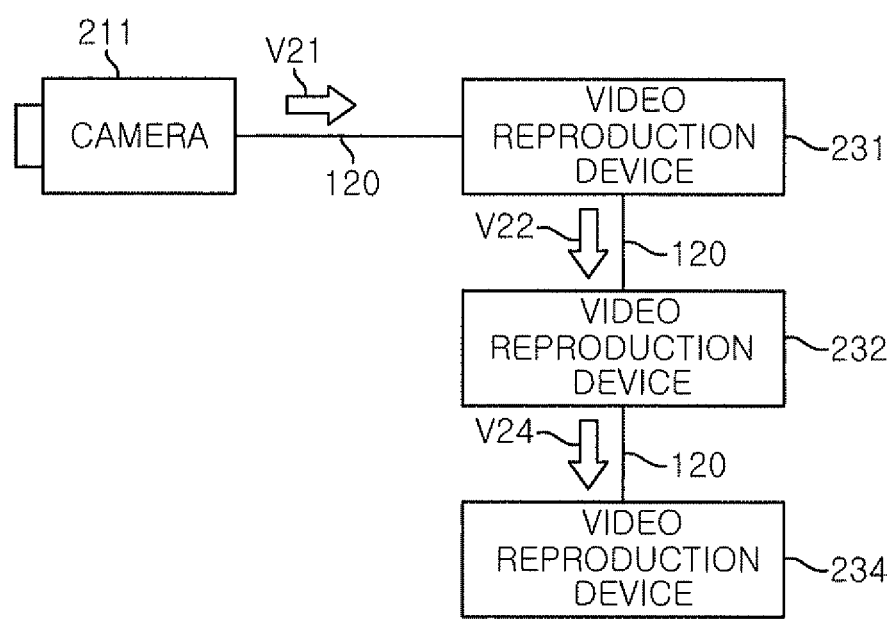
FIG. 7 is a view for explaining a route through which a video stream is transmitted and received in the video distribution system in accordance with the embodiment of the present invention.

Moreover, FIG. 5 is a flowchart showing a process in a camera 211 shown in FIG. 2 in accordance with the present embodiment, and FIG. 6 is a flowchart showing a process in a video reproduction device 231, 232, 233 or 234 in accordance with the present embodiment. Finally, FIG. 7 is a view for explaining a route through which a video stream is transmitted and received between the camera 211 and the video reproduction devices 231, 232 and 234 in accordance with the embodiment.

Reference numerals 211 and 212, 231 to 234, 36, and V21, V22 and V24 indicate cameras, video reproduction devices, relay units of the video reproduction devices 231 to 234, and the video streams, respectively. Each of the cameras 211 and 212 is a web camera including a web encoder, for example. Each of the camera 211 and 212 distributes, e.g., a VGA type video, and the frame rate thereof required by the video reproduction device is determined as, e.g., 30 fps.

In FIG. 2, each of the cameras 211 and 212 is a network camera that is connected to the network 120 and converts a photographed video into a JPEG format video to transmit it in unit of stream to a terminal such as a video reproduction device that requests the video to be distributed thereto. Each of the cameras 211 and 212 has the video distribution capacity M of the 60 fps. Each of the video reproduction devices 231 to 234 is a network camera video reproduction device that obtains video data from a video output device such as the cameras 211 and 212 through the communications of the network 120 to reproduce the obtained video data and re-distributes the same video data to other video reproduction devices. The video reproduction device 231, 232, 233 or 234 in accordance with the present embodiment has the structure of the video reproduction device 131, 132, 133 or 134 shown in FIG. 1 and further includes the relay unit 36 (referring to FIG. 4) for re-distributing a received video through the network 120 to other video reproduction devices.

The video reproduction device 231, 232, 233 or 234 obtains video data from the camera 211 or 212 connected to the network 120 to reproduce the obtained video data by the manipulation of a user.

In the embodiment shown in FIG. 2, the video stream V21 photographed by the camera 211 is transmitted to the video reproduction device 231 through the network 120. The video reproduction device 231 reproduces the received video stream V21, and the relay unit 36 of the video reproduction device 231 re-distributes the video stream as a video stream V22 to the video reproduction device 232 through the network 120. The video reproduction device 232 reproduces the received video stream V22, and the relay unit 36 of the video reproduction device 232 re-distributes the video stream as a video stream V24 to the video reproduction device 234 through the network 140. At a present time, no re-distribution request of a video stream is received through the network 120 from other video reproduction device and, thus, the relay unit 36 of the video reproduction device 234 re-distributes no video stream.

The video streams V21, V22 and V24 are same video data. In the present embodiment shown in FIG. 2 and following figures, the same video data is differently numbered to discriminately describe the flow of the transmitted and received video stream.

If the transmitting of the video stream V21 is ended, the camera 211 starts to generate and transmit a next photographed video stream (not shown). Further, if the receiving of the video stream V21 or V22 and the re-distributing of the video stream V22 or V24 are ended, the video reproduction device 231 or 232 generate and transmit a next obtained video stream (not shown).

Next, the camera shown in FIG. 2 in accordance with the present embodiment will be described by referring to the block diagram shown in FIG. 3. In the camera 210, an incident light is introduced into the photographing unit 12 through the lens part 11 at an incident angle within a visual range. The photographing unit 12 converts the introduced light to a video signal to output it to the video processing unit 13. The video processing unit 13 performs a well-known video treatment on the video signal and outputs it to the encoder unit 14. The encoder unit 14 includes a web encoder and converts inputted video data to, e.g., JPEG format data and transmits it to a desired video reproduction device through the network 120. The control unit 15 controls elements within the camera 210 in accordance with a software stored therein. For example, the control unit 15 performs a necessary process such as a process of a flowchart shown in FIG. 5, 8 or 11 with regard to a distribution request received from the video reproduction device through the network 120.

Moreover, the video reproduction device shown in FIG. 2 in accordance with the present embodiment will be described by referring to the block diagram shown in FIG. 4. Video data is transmitted from the camera, through the network 120, to the decoder unit 31 of the video reproduction device 230. The decoder unit 31 re-converts the received video data and outputs it to the display unit 32, and the display unit 32 reproduces a corresponding video. The decoder unit 31 also outputs the received video data to the relay unit 36 without the conversion of the video data. The relay unit 36 temporarily keeps the inputted video data.

The control unit 33 controls elements within the video reproduction device 230 in accordance with a software stored therein. For example, the control unit 33 performs a necessary process such as a process of a flowchart shown in FIG. 6, 7, 9 or 10 with regard to each signal or data transmitted from the manipulating unit 35 of the video reproduction device 230, another video reproduction device or the camera through the network 120.

The manipulating unit 35 replies to an instruction from a user, or accesses and is accessed by the control unit 33 to perform a process, for example, to transfer to control unit 33 instructions such as distribution request manipulation, interrupt request manipulation, camera selection, requested distribution rate (distribution-requested frame rate) and the like.

In addition, the relay unit 36 of the video reproduction device 230 temporarily keeps video data distributed through the network 120 to re-distribute the video data to another video reproduction device through the network 120. Under the control of the control unit 33, the relay unit 36 outputs the kept video data to the decoder unit 31 and re-distributes it from the decoder unit 31 to the corresponding video reproduction device through the network 120.

Although the relay unit 36 and the decoder 32 are provided as separated units in the embodiment shown in FIG. 4, the relay unit 36 may be provided in the decoder unit 31 as a single unit.

Alternatively, for example, the relay unit 36 shown in FIG. 4 may include a web encoder, encode again the video data that has been converted to be reproduced in the display unit 32 and re-distribute it to the corresponding video reproduction device through the network 120.

In the above, the structure including two cameras and four video reproduction devices has been taken as an example, but the numbers of the cameras and the video reproduction devices are not limited thereto.

In the meantime, the cameras may have different video distribution capacities, and the video reproduction devices may request video data to be distributed thereto at different frame rates.

Next, a process of the camera of the video distribution system in accordance with the embodiment of the present invention will be described by using the flowchart shown in FIG. 5.

In FIG. 5, the camera 211 of the video distribution system in accordance with the embodiment of the present invention photographs target objects within a visual field at, e.g., 30 fps. The following operations of the camera 211 are performed by a control unit including a CPU (not shown) and the like therein, for example. The camera 211 has been distributing a video to the video reproduction device 231.

At this time, in step S501, the camera 211 determines at a predetermined period whether or not a connection request has been received from other video reproduction devices than the video reproduction device 231 that has been connected thereto through the network 120 and has been receiving video data. If no connection request is received from other video reproduction devices than the video reproduction device 231, the camera 211 repeats an operation of step S501. If a connection request is received from a video reproduction device (e.g., the video reproduction device 232) other than the video reproduction device 231, the camera 211 performs an operation of step S502.

The camera 211 calculates the sum P (P=R+Q) of a desired distribution rate R of the video reproduction device 232 and the current distribution rate Q in step S502 and performs an operation of step S503.

In step S503, the camera 211 determines whether its distribution capacity M is equal to or greater than the sum P calculated in step 502 (M≥P) or not (M<P). In case the distribution capacity M is equal to or greater than the sum P (M≥P: Yes), the camera 211 performs an operation of step S504 since the requested distribution rate is within the distribution capacity thereof. On the other hand, in case that the distribution capacity M is smaller than the sum P (M<P: No), the camera 211 performs an operation of step since the requested distribution rate is beyond the distribution capacity thereof.

In step S504, the camera 211 starts the distribution from the newest video to the new distribution-requesting video reproduction device 232 in addition to the already-connected video reproduction device 231.

In step S505, the camera 211 transmits a notification that the distribution is impossible to the video reproduction device 232.

After steps S504 or S505, the camera 211 returns to the operation of step S501.

In FIG. 5, the fluctuation in the distribution rate of the network 120 serving as a distribution path may be taken into consideration. In step S503, instead of determining whether the distribution capacity M is equal to or greater than the sum P (M≥P), a predetermined coefficient K or a predetermined value F may be used such that such determination is performed by using an equation M≥P×K or M≥P+F.

Next, a process in a video reproduction device of a video distribution system in accordance with the embodiment of the present invention will be described by using the flowchart shown in FIG. 6. The following operations in the video reproduction device are performed by a control unit including a CPU (not shown) and the like therein, for example.

In FIG. 6, a user manipulates the video reproduction device of the video distribution system in accordance with the embodiment of the present invention through, e.g., the well-known GUI (Graphical User Interface) or the like to obtain image data from a desired camera; and selects a desired camera and a desired distribution rate.

The desired camera is selected by, e.g., selecting its IP address.

In step S601, the video reproduction device determines at a predetermined period whether or not a manipulation for a new distribution request has been received from a user who manipulates the video reproduction device. If no manipulation for a new distribution request is received, the video reproduction device repeats the operation of step S601. On the other hand, if a manipulation for a new distribution request is received, the video reproduction device performs an operation of step S602. Here, the reason that the new distribution request is described by using the word "new" is because the case that the video reproduction device has already been receiving a video from a different camera or has obtained a video from a different camera to display the videos alternately on a single screen or on divided screens is considered.

The video reproduction device transmits a connection request and information related to a desired distribution rate to the selected camera through the network 120 in step S602 and performs an operation of step S603.

In Step S603, the video reproduction device determines at a predetermined period whether or not a response from the camera receiving the connection request has been received. If no response is received, the video reproduction device repeats the operation of step S603. On the other hand, if a response is received, the video reproduction device performs an operation of step S604. Further, if no response is received for a preset time or within a predetermined number of repeating the determining operation, the video reproduction device may notify a user of a communications error and end the process shown in FIG. 6.

In step S604, the video reproduction device determines whether or not the distribution is possible from a content of the received response. If the distribution is determined to be possible, the video reproduction device performs an operation of step S610. On the other hand, if it is determined that the distribution is not possible, the video reproduction device performs an operation of step S605.

The video reproduction device searches the network 120 to check whether there is a video reproduction device that obtains the desired video in step S605 and performs an operation of step S606.

For example, to perform the search, the video reproduction device of the present embodiment may be set up in advance to make the communications with different video reproduction devices to read out the IP address and the available distribution rate of the camera that has received the connection request from the different video reproduction devices.

In step S606, the video reproduction device determines whether or not the video reproduction device that obtains the desired video is found from the searched result. Then, if no video reproduction device is found, the video reproduction device performs the operation of step S605. On the other hand, if the video reproduction device is found, the video reproduction device performs an operation of step S607. Further, if no video reproduction device is found within a predetermined time from the searched result, the video reproduction device may notify a user that no device is found and end the process shown in FIG. 6.

The video reproduction device transmits a connection request and information related to a desired distribution rate to the found video reproduction device in step S607 and performs an operation of step S608.

In step S608, the video reproduction device determines at a predetermined period whether or not a response is received from the video reproduction device that has received the connection request. If no response is received, the video reproduction device repeats the operation of step S608.

On the other hand, if a response is received, the video reproduction device performs an operation S609. Further, if no response is received for a preset time or until the frequency of repeating the determining operation reaches a predetermined number, the video reproduction device may notify a user of a communications error and end the process shown in FIG. 6 or perform the searching operation of step S605 again.

In step S609, the video reproduction device determines whether or not the distribution is possible based on a content of the received response. If the distribution is determined to be possible, the video reproduction device performs an operation of step S610. On the other hand, if it is determined that the distribution is not possible, the video reproduction device performs the searching operation of step S605 again.

If video data distributed from the camera is received, the video reproduction device reproduces the received video data in step S610. FIG. 7 schematically shows a route through which a video photographed by the camera 211 described with reference to FIG. 2 and the like is distributed to the video reproduction devices 231, 232 and 234.

In FIG. 7, the camera 211 transmits a stream V21 of the photographed video to the video reproduction device 231 through the network 120. The video reproduction device 231 reproduces the received stream V21 and outputs it as a stream V22. The stream V22 is transmitted to the video reproduction device 232 through the network 120. The video reproduction device 232 reproduces the received stream V22 and outputs it as a stream V24. The stream V24 is transmitted to the video reproduction device 234 through the network 120. The video reproduction device 234 reproduces the received stream V24. The streams V21, V22 and V24 are the same stream. For example, when re-distributing the stream V22 to the video reproduction device 232, the video reproduction device 231 generates, e.g., a copy of the stream V21 and outputs the copy as the stream V22.

In the embodiment shown in FIGS. 2 to 7, in case that a plurality of video reproduction devices obtain video data from one camera, some of the plural video reproduction devices obtains the video data by directly performing the network communications with the camera, but the other video reproduction devices obtains the video data by performing the network communications with the video reproduction devices that have obtained the video data by directly performing the network communications with the camera. In this way, it is possible to solve the problem that a distribution rate of the video data is restricted when the video data is distributed from one network camera to a plurality of network camera video reproduction devices.

The present embodiment will be described in more detail with reference to FIGS. 5 and 6. In the embodiment shown in FIGS. 5 and 6, when a video reproduction device (referred to as "video reproduction device X") has been connected to one camera, another video reproduction device (referred to as "video reproduction device Y") transmits a connection request to the camera. In this case, such connection request includes a desired distribution rate. The camera checks whether the sum of desired distribution rates of the video reproduction devices X and Y goes beyond its own distribution capacity. Then, if the sum is not beyond the distribution capacity, the video data are distributed to the video reproduction devices X and Y.

If the sum of the desired distribution rates of the video reproduction devices X and Y is beyond the distribution capacity, the camera notifies the video reproduction device Y that the desired distribution rate is impossible. In case that the video reproduction device Y receives such notification from the camera, the video reproduction device Y searches for other video reproduction devices connected to the network 120, which receive the video data from the camera and obtains the video data from a video reproduction device that replies to the video reproduction device Y based on the searched result. In this case, since the video reproduction device that obtains the video data from the camera is the video reproduction device X, the video reproduction device Y receives the video data from the video reproduction device X. Accordingly, even when the camera receives a distribution request that is beyond its own distribution capacity, it is possible to satisfy respective desired distribution rates of the video reproduction devices.

Figure 8:
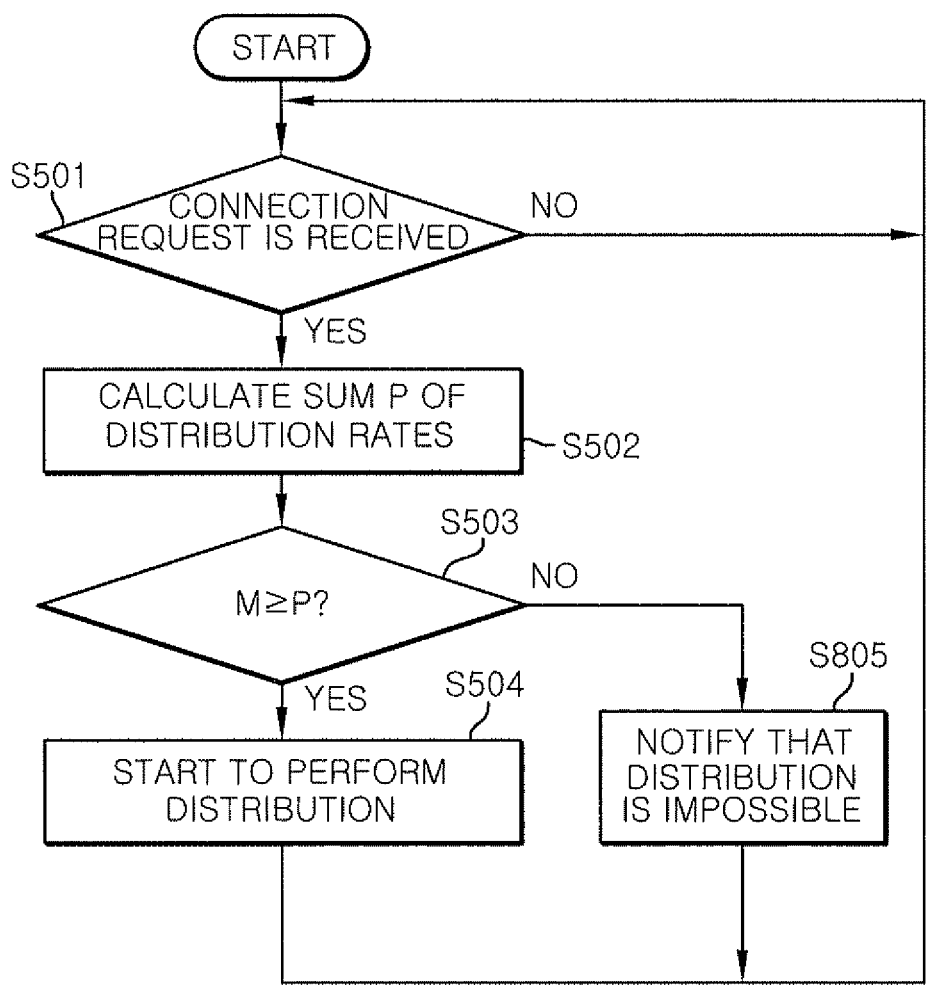
FIG. 8 is a flowchart showing a process of a camera in accordance with another embodiment of the present invention.

Next, another embodiment of the present invention will be described with reference to FIGS. 8 and 9. FIG. 8 is the flowchart shown in FIG. 5 where step S505 is replaced with step S805, and FIG. 9 is the flowchart shown in FIG. 6 where steps S602, S604 and S606 are respectively replaced with steps S902, S904 and S906; and step S605 is deleted.

Figure 9:
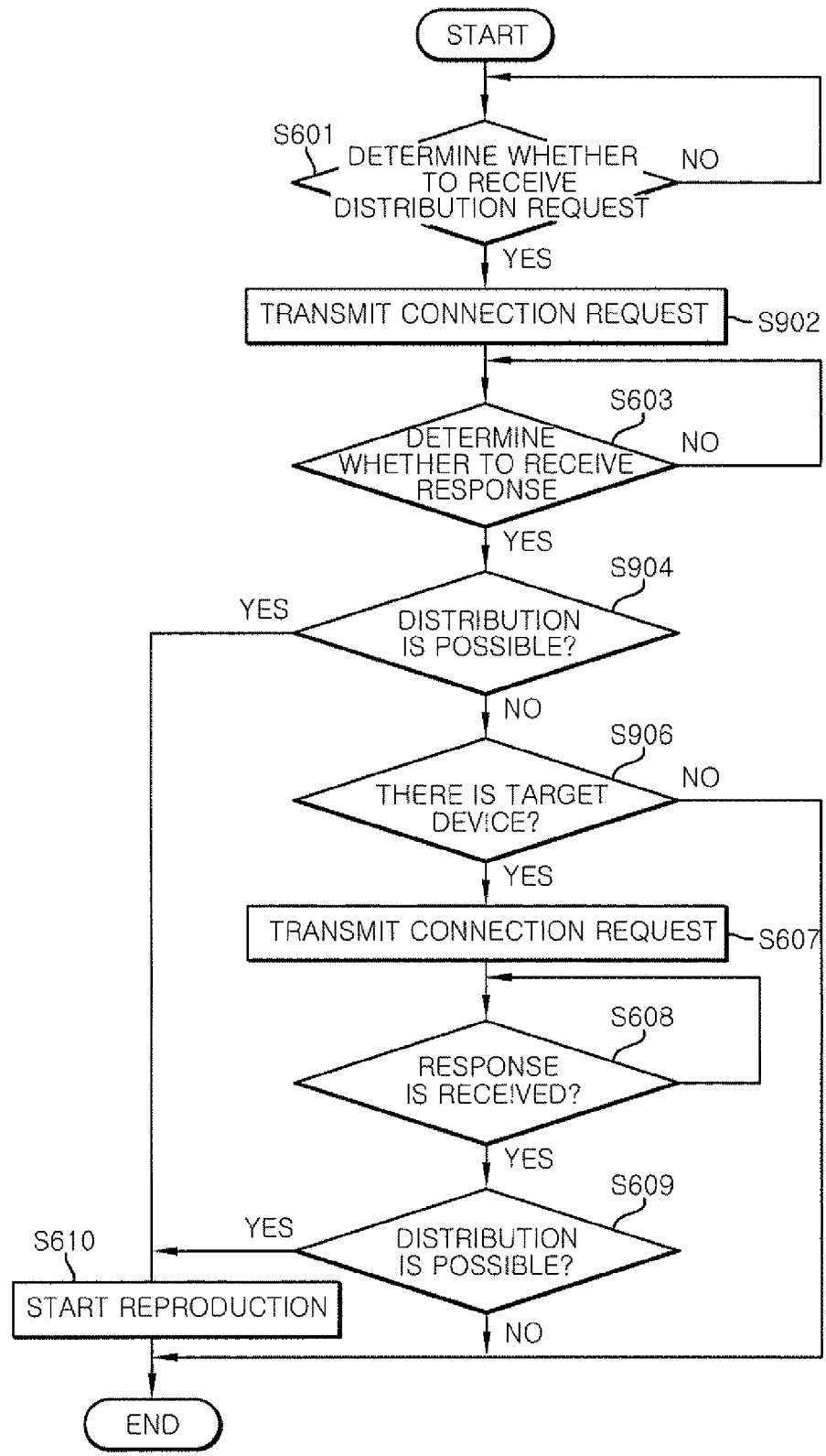
FIG. 9 is a flowchart showing a process of a video reproduction device in accordance with the embodiment of the present invention.

In FIGS. 8 and 9, the description related to the same steps as those of FIGS. 5 and 6 will be omitted.

In FIG. 8, as the result of determination of step S503, if the distribution capacity M of the camera is smaller than the sum P (M<P), the camera performs an operation of step S805.

In step S805, the camera transmits to a new distribute-requesting video reproduction device a notification that the distribution is impossible and information related to an IP address, a distribution rate and a re-distribution ability of the video reproduction device that has video data from the camera.

Further, in the present embodiment shown in FIG. 8, the variation of the distribution rate of the network serving as a distribution path may be taken into consideration. In step S503, instead of determining whether the distribution capacity M is equal to or greater than the sum P (M≥P), a predetermined coefficient K or a predetermined value F may be used such that such determination is performed by using an equation M≥P×K or M≥P+F.

In step S902 shown in FIG. 9, the video reproduction device transmits a connection request and information related to a desired distribution rate and a re-distribution ability to a camera selected by a user through the network 120. Then, the video reproduction device performs the operation of step S603. As the result of the determination of step S603, in the case of receiving a response from the camera that has received the connection request, the video reproduction device performs an operation of step S904.

In step S904, the video reproduction device determines whether or not the distribution is possible based on a content of the received response. If the distribution is determined to be possible, the video reproduction device performs the operation of step S610. On the other hand, if it is determined that the distribution is not possible, the video reproduction device performs an operation of step S906.

In step S906, the video reproduction device determines whether or not there is a target video reproduction device capable of re-distribution by reading out information related to the IP address, the distribution rate and the re-distribution ability of the video reproduction device that has been receiving the video from the corresponding camera, the information being included in the notification response transmitted from the corresponding camera. If there is no target video reproduction device, the process of FIG. 9 is ended. On the other hand, if there is the target video reproduction device, the video reproduction device performs the operation of step S607.

In accordance with the embodiment shown in FIGS. 8 and 9, in case that the video reproduction device transmits the connection request to the camera in order to request the camera to distribute video data thereto and, then, receives a response reporting that the direct distribution is impossible from the camera, the video reproduction device further receives the information related to the video reproduction device that has been receiving the video data from the camera. Accordingly, it becomes unnecessary to search the network and, thus, it is possible to quickly obtain the desired video transferred from the camera.

Further, in case that the camera distributes the video data to a plurality of video reproduction devices, the camera gives the notification including information related to the plural video reproduction devices that have already received the video data therefrom to a video reproduction device in step S805 shown in FIG. 8. Accordingly, the video reproduction device can select adequate one device for the re-distribution from the information related to the plural video reproduction devices that have already received the video data in step S906 shown in FIG. 9. The adequate video reproduction device indicates a video reproduction device having the distribution capacity capable of re-distributing corresponding video data having a smallest distribution delay rate.

Next, still another embodiment of the present invention will be described with reference to FIGS. 10 to 13. In the present embodiment, in case that the video stream is transmitted and received between the camera 211 and the video reproduction devices 231, 232 and 234 in FIG. 7, even when the connection between the video reproduction device 231 and the camera 211 is interrupted, the remaining video reproduction devices 232 and 234 can continuously obtain the video stream from the camera 211.

Figure 10:
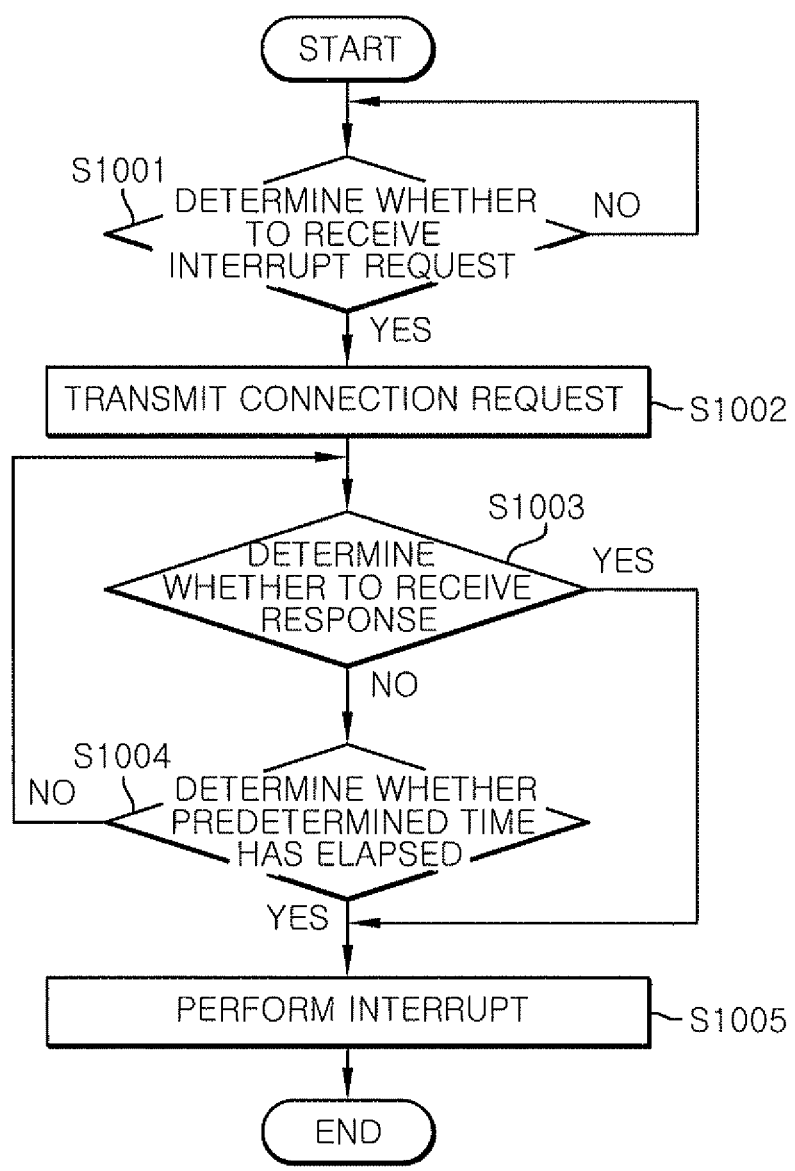
FIG. 10 is a flowchart showing a process of a video reproduction device in accordance with still another embodiment of the present invention.
Figure 11:
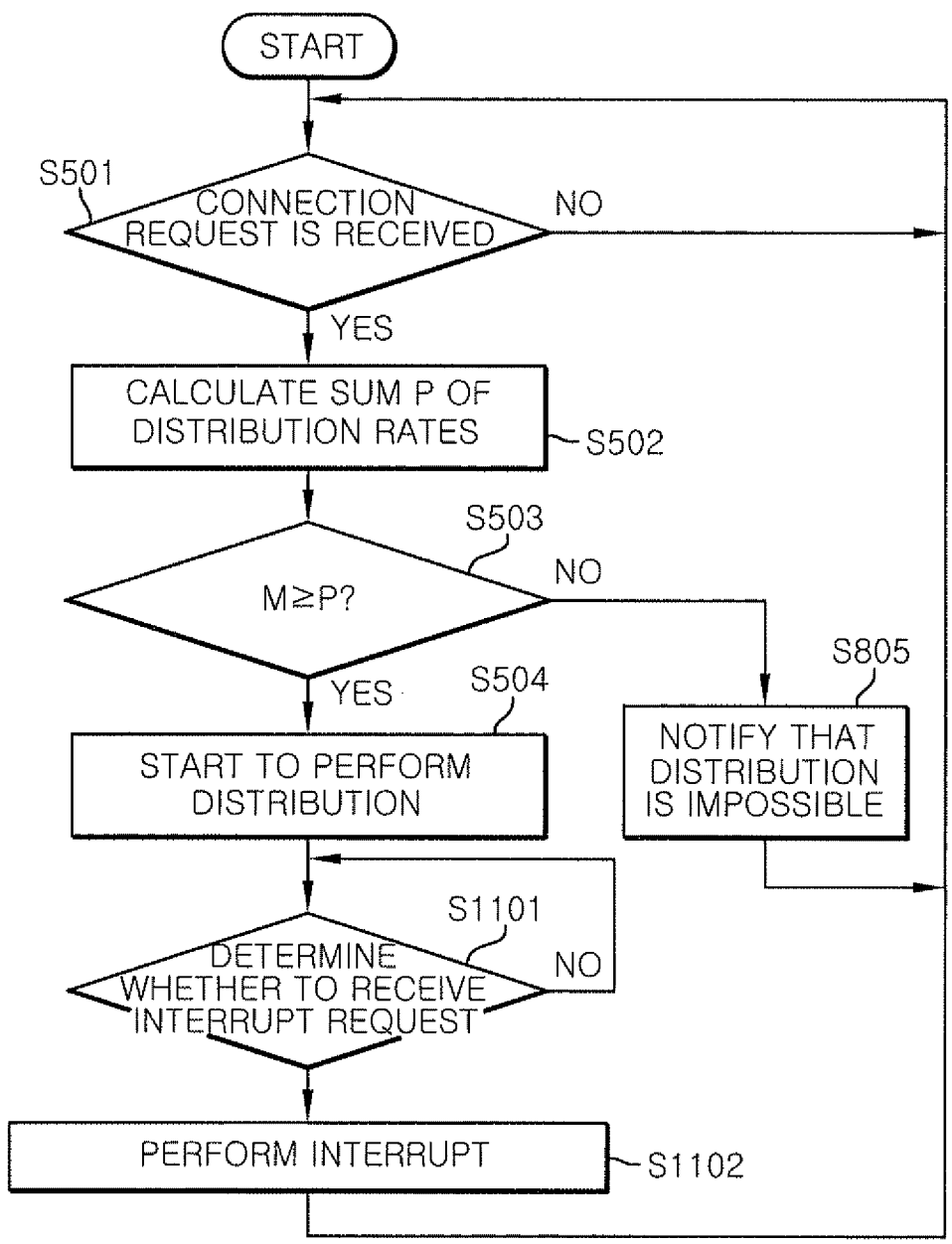
FIG. 11 is a flowchart showing a process of a camera in accordance with the embodiment of the present invention.
Figure 12:
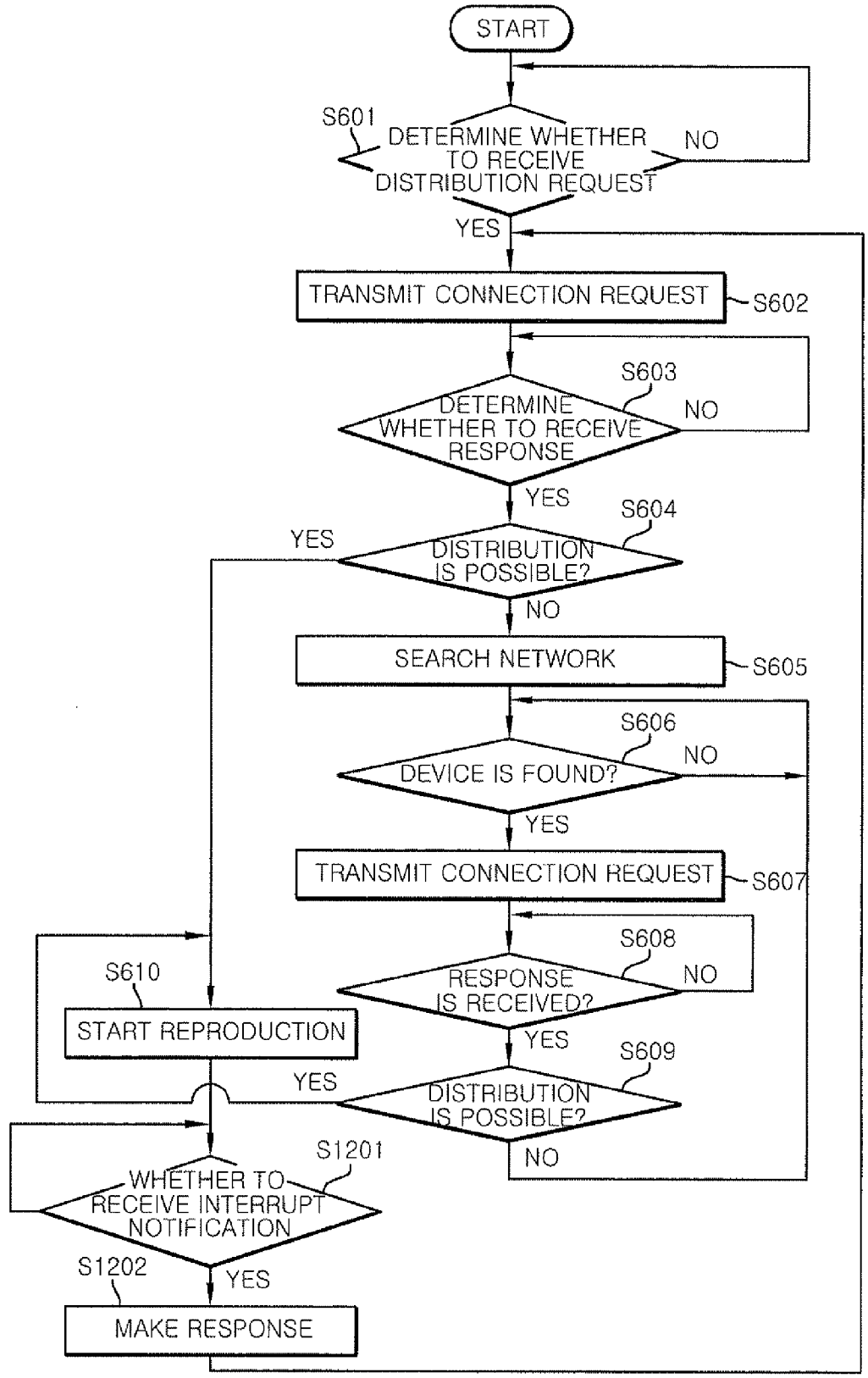
FIG. 12 is a flowchart showing a process of a video reproduction device in accordance with still another embodiment of the present invention.
Figure 13:
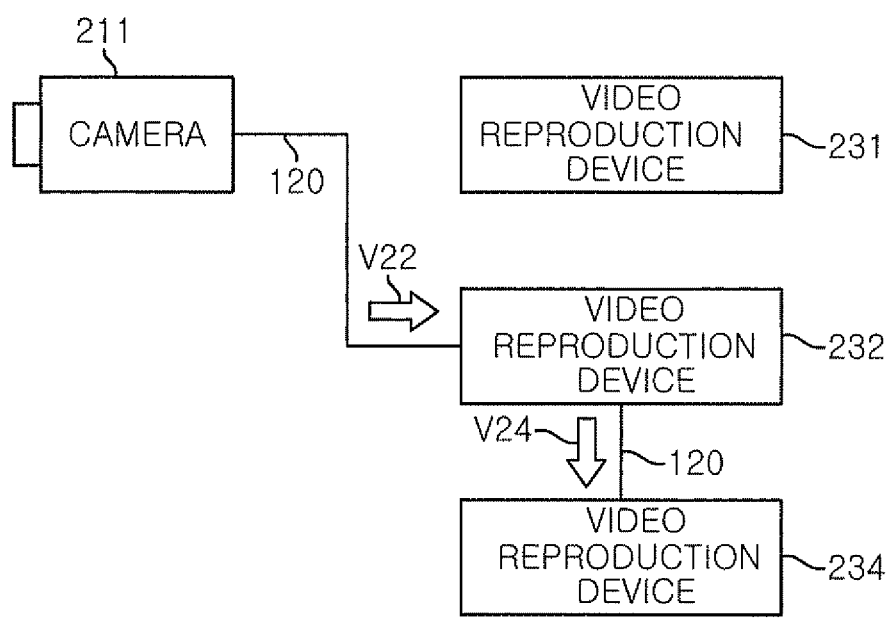
FIG. 13 is a view for explaining a route through which a video stream is transmitted and received in a video distribution system in accordance with the embodiment of the present invention.

FIG. 10 is a flowchart showing a process of a video reproduction device in a video distribution system in accordance with the present embodiment, and FIG. 11 is a flowchart showing a process of a camera in the video distribution system in accordance with the present embodiment. FIG. 12 is a flowchart showing a process of a video reproduction device in a video distribution system in accordance with a different embodiment from that shown in FIG. 10, and FIG. 13 is a view for explaining a route through which a video stream is transmitted and received between the camera 211 and the video reproduction devices 231, 232 and 234.

In step S1001 shown in FIG. 10, the video reproduction device 231 that has been receiving a video from the camera 211 through the network 120 determines whether or not a manipulation for stopping obtaining the video from the camera 211 is performed by a user of the video reproduction device 231. In other words, the video reproduction device 231 determines at a predetermined period whether the manipulation for interrupting the communications with the camera 211 is received or not.

In case that no interrupting manipulation is received, the process returns to step S1001 to repeat the operation of step S1001 at a predetermined period. If the interrupting manipulation is received, the video reproduction device 231 performs an operation of step S1002.

In step S1002, the video reproduction device 231 notifies a video reproduction device (e.g., the video reproduction device 232 shown in FIG. 2 or 7) receiving the video therefrom that the stopping of obtaining the video from the camera 211 is requested by the user (i.e., interrupt request transmission).

Then, the video reproduction device 231 determines whether or not a receipt response is received from the video reproduction device receiving the video therefrom in step S1003. The video reproduction device 231 performs an operation of step S1004, if no receipt response is received, and an operation step S1005, if the receipt response is received.

In step S1004, the video reproduction device 231 determines whether a predetermined time has elapsed since the interrupt request is transmitted. If the predetermined time has not elapsed, the process returns to step S1003. On the other hand, if the predetermined time has elapsed, the video reproduction device 231 performs the operation of step S1005.

In step S1005, the video reproduction device 231 stops obtaining the video from the camera 211.

In the embodiment shown in FIG. 10, the video reproduction device that performs the interrupt has been receiving a video from the camera directly. However, in case that the video reproduction device that performs the interrupt has been receiving a video from another video reproduction device, the device receiving the interrupt request in step S1002 and the video reproduction device to transmit the receipt response in step S1003 are the video reproduction device that has been re-distributing the video. The device performing the interrupt in step S1005 may be the video reproduction device outputting the video through the re-distribution.

Moreover, in this case, the device receiving the interrupt request in step S1002, that is the device to transmit the receipt response in step S1003 may perform the operation of step S602 or S902 shown in FIG. 6 or 9; or operations of step S602 and next steps shown in FIG. 12 to be described later.

FIG. 11 is a flowchart showing a process of the camera 211 in case that the video reproduction device 231 performs an interrupt operation with regard to the camera 211 when the operation of step S1005 is performed. In FIG. 11, steps S1101 and S1102 are added to the flowchart shown in FIG. 5 or 8 after the distribution of video data to the video reproduction device 231 is started (step S504) to determine at a predetermined period whether or not an interrupt request is received.

In other words, in step S1101, the camera 211 repeats the operation of step S1101, if no interrupt request is received, and performs an operation of step S1102, if the interrupt request is received.

In step S1102, the interrupt is performed and the process returns to the operation of step S501.

FIG. 12 is a flowchart showing a process of the interrupt in case that video data is directly distributed from a camera, or video data is re-distributed from a video reproduction device to another video reproduction device.

The process shown in FIG. 12 includes the same operations of steps S601 to S610 as those of FIG. 6 and further includes operations of step S1201 and S1202 after step S610.

In the same steps shown in FIG. 12 as those of FIG. 6 or 9, the same operations are performed. After the reproduction is started in step S610, the video reproduction device determines at a predetermined period whether or not an interrupt notification is received from the video reproduction device that has been re-distributing video data thereto. If no interrupt notification is received, the video reproduction device repeats the operation of step S1201. On the other hand, if the interrupt notification is received, the video reproduction device performs an operation of step S1202.

In step 1202, the video reproduction device makes a response that the interrupt notification is received and performs the operation of S602 to obtain a video again.

Then, the video reproduction device starts to perform the reproduction from the video newly obtained after the connection.

FIG. 13 schematically shows a route through which a video stream is transmitted or received between the camera 211 and the video reproduction devices 232 and 234 after the video reproduction 231 stops obtaining the video from the camera 211 by the manipulation of a user.

In the embodiments shown in FIGS. 10 to 13, when a video reproduction device that has received a re-distribution request from a different video reproduction device interrupts the communications with a camera by the manipulation of a user, the video reproduction device first gives an interrupt notification to the different video reproduction device that has requested the re-distribution and, then, interrupts the communications with the camera. Accordingly, the different video reproduction device to which the video reproduction device has re-distributed the video can request the camera to be connected thereto again when the interrupt notification is received from the video reproduction device that has been re-distributing the video thereto.

In the aforementioned embodiments, when a video is transmitted from a camera to a video reproduction device through a network, the video is converted to a JPEG format video. However, any format video may be used without the restriction of the JPEG format when the video is transmitted from a camera to a video reproduction device through a network.

While the invention has been shown and described with respect to the embodiments, it will be understood by those skilled in the art that various changes and modifications may be made without departing from the scope of the invention as defined in the following claims.

What is claimed is:

1. A video reproduction method of a video reproduction device for obtaining through a network a video photographed by a camera connected to the network and reproducing the obtained video, comprising the steps of:
   (a) requesting the camera to distribute the video photographed by the camera thereto at a first distribution rate, and
   (b) if the camera has been distributing the video to one or more other video reproduction devices at a second distribution rate in total at the time of being requested by the video reproduction device, and a video distribution capacity of the camera is smaller than a sum of the first and the second distribution rate, requesting one of the other video reproduction devices to re-distribute the video thereto and obtaining the video from said one of the other video reproduction devices.

2. The video reproduction method of claim 1, further comprising the steps of:
   (c) if the video distribution capacity of the camera is smaller than the sum, receiving a notification that video distribution is impossible from the camera before requesting said one of the other video reproduction devices to re-distribute the video thereto; and
   (d) if said one of the other video reproduction devices stops obtaining the video from the camera, repeating the steps (a) to (c) with respect to the remainder of the other video reproduction devices.

3. The video reproduction method of claim 1, wherein the step of (b) includes:
   (b1) receiving from the camera or searching on the network information related to IP addresses, distribution rates and re-distribution abilities of the other video reproduction devices, and
   (b2) selecting said one of the other video reproduction devices for video re-distribution based on the information.

4. A video distribution system comprising a video reproduction device that obtains a video photographed by a camera connected to a network therefrom and reproduces the obtained video, the device comprising:
   a relay unit configured to re-distribute the video photographed by the camera to another video reproduction device when said another video reproduction device requests the video reproduction device to re-distribute the video thereto; and
   the camera connected to the network,
   wherein, if the camera has been distributing the photographed video to one or more other video reproduction devices including the video reproduction device at a first distribution rate in total when said another video reproduction device newly requests the camera to distribute the photographed video thereto at a second distribution rate, and a sum of the first and the second distribution rate is greater than a video distribution capacity of the camera, said another video reproduction device is configured to request the video reproduction device to re-distribute the video thereto and obtain the video from the video reproduction device.

5. The video distribution system of claim 4, wherein if the sum is greater than the video reproduction capacity of the camera, the camera is configured to output a notification that a distribution is impossible to said another video reproduction device.

6. The video distribution system of claim 4, wherein said another video reproduction device is configured to:
   receive from the camera or search on the network information related to IP addresses, distribution rates and re-distribution abilities of the other video reproduction devices, and
   select the video reproduction device for video re-distribution among the other video reproduction devices based on the information.

7. The video reproduction device of claim 4, wherein the video reproduction device is configured to:
   determine whether a manipulation for stopping obtaining the video from the camera is received or not from a user,
   transmit an interrupt request to said another video reproduction device when the manipulation is received from the user, and
   stop obtaining the video from the camera when a receipt response for the interrupt request is received from said another video reproduction device.

* * * * *